6535X
P. C. Curtis,
Steam-Boiler Condenser.
Patented May 3, 1831.
NO PRINTED COPY OF SPECIFICATION IN OFFICE.
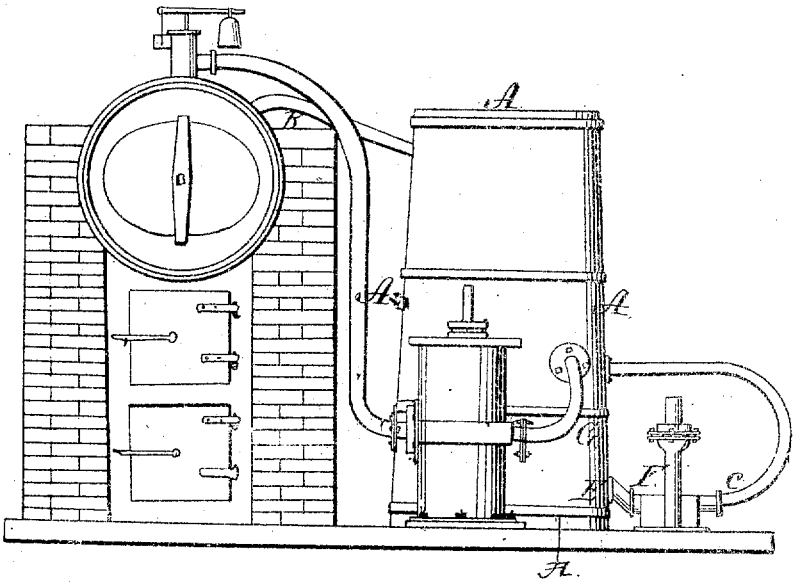

Philo C. Curtis 6535X
Letters Patent

The Schedule referred to in these Letters Patent and making part of the same containing a description in the words of the said Philo C. Curtis himself of his improvement being an apparatus to be connected with and to form part of a Steam Engine Boiler.——

To all to whom these presents shall come.
Be it known that I Philo C. Curtis of Utica in the County of Oneida and State of New York have discovered and invented a new & useful improvement being an apparatus to be connected with and form part of a Steam Engine Boiler and that the following is a full and description of the construction and nature of said improvement as discovered and invented by me— ——

Make a strong tub of wood about four feet in height and two feet and four inches in diameter at the top and two feet eight inches in diameter at the bottom. This is of a suitable size for a high pressure ten horse power engine. This tub should have two heads, one at each end and a partition about eighteen inches from the bottom of the tub. In the drawing annexed. the lines marked A exhibit the form of the tub. Within the tub and between the upper head thereof and said partition place a strong tube with a calibre of about one & a fourth inch in diameter and about sixty feet long coiled similar to a common condensing worm for a distillery. one end of this tube passes through the upper part of the tub and is firmly connected with the boiler as represented in the drawing annexed at the letter B. the other end passes through the lower part of the tub above said partition and is firmly connected with the forcing pump pump of the engine as at the letter C. on said drawing. The upper part of the tub should be tight except an inlet for the steam from the piston cylinder D. on said drawing, and an outlet for said steam through a tube firmly connected with the said partition and from thence extending down to wards the bottom of said tub and through which tube the steam is conducted into the lower part of said tub, and below the surface of the water therein, as said lower part should be kept about half full of water. This water may be supplied either from a fountain or by the operation of the engine to serve for feeding water for the boiler. A tube of the calibre of the one first above mentioned should be placed between the tub and the forcing pump: one end of which said tube should be firmly connected with a hole in the side of said tub and near to the lower end thereof so as to receive the water from the said lower part of said tub, and the other end of the said tube should be firmly connected with the forcing pump. Letter E. on the annexed drawing shows the point of connexion between said tube & said tub, & letter F. shows the point of connexion between said tube & said forcing pump.

When the engine is in operation the said forcing pump draws water from the lower part of the tub into the tube at E. thence through the said tube thence it passes through said pump thence into a tube at C. thence through that tube as it is continued & coiled through the upper part of said tub & so on until it is discharged into the boiler at the letter B. The steam from the piston cylinder is conducted from said cylinder through a tube and discharged into the upper part of said tub at the letter D. the steam so discharged into said tub, fills said upper part and heats the water as it passes from the forcing pump through the tube to the boiler as before described. [illegible]
[illegible]

upper part of the tub the steam passes into the lower part of said tub. through the tube of which mention has been before made and from this part of said tub that part of said steam which remains uncondensed passes off through a tube at [illegible] G. as indicated on the drawing annexed. and which tube should be connected with said tub below the partition and above the water in said lower part of said tub. The objects to be effected by [illegible] the improvement and apparatus above described are 1 a reduction in the consumption of fuel for the boiler — this is done by giving to the water which is conveyed into said boiler a very high temperature on its passage through the said coiled tube in the upper part of the tub. 2. this mode of supplying heat for the water in the boiler is more regular than it could be if furnished by fuel alone hence less attention to the furnace is required, & the generation and supply of steam from the boiler are more regular than in the ordinary mode. The object of the coiled tube is to form a surface of sufficient size which being exposed to the steam in the upper part of the tub, will allow the water in passing through said tube time to acquire very nearly the temperature of the steam in said tub and which as the water is confined in said tube so that it cannot change into steam is practicable; the water is thus raised in temperature much above boiling heat; and in that state passes into the boiler The above described form I think the best calculated to produce the desired effect —

The size of the apparatus must be varied in proportion to the capacity of the engine. The combination of the above apparatus and the applica= thereof to effect the object above specified are what I claim to have

5/3/1831 6535X discovered and invented

Witnesses

Jonathan Ball Jr

Uriah C. Palmer

Philo C. Curtis

Exd

N.F.C.

(Patented May 9. 1831)

(10 Models)